US012744795B2

(12) United States Patent
Kruczek et al.

(10) Patent No.: US 12,744,795 B2
(45) Date of Patent: Sep. 22, 2026

(54) REMOTE RECOVERY AND RE-ESTABLISHMENT OF IDENTITY FOR NETWORK DEVICES WITH EXPIRED AUTHENTICATION VIA POISONED NETWORK SERVICES

(71) Applicant: Charter Communications Operating, LLC, St. Louis, MO (US)

(72) Inventors: James Kruczek, Lone Tree, CO (US); Joshua Edgar Nelson, Aurora, CO (US); Daniel Patrick Riley Mattox, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/750,238

(22) Filed: Jun. 21, 2024

(65) Prior Publication Data

US 2025/0392604 A1 Dec. 25, 2025

(51) Int. Cl.
*H04L 9/40* (2022.01)
*H04L 41/082* (2022.01)

(52) U.S. Cl.
CPC ........ *H04L 63/1416* (2013.01); *H04L 41/082* (2013.01); *H04L 63/0876* (2013.01); *H04L 63/20* (2013.01)

(58) Field of Classification Search
CPC .. H04L 63/1416; H04L 63/0876; H04L 63/20
USPC .......................................................... 726/22
See application file for complete search history.

(56) References Cited

U.S. PATENT DOCUMENTS 10,749,883 B1 * 8/2020 Martin .................. G06F 21/554
10,795,996 B2 * 10/2020 Chistyakov ............. G06F 21/57
2017/0188223 A1 * 6/2017 Gundavelli ........... H04W 48/16
2018/0123917 A1 * 5/2018 Pan ..................... H04L 41/0661
2019/0019058 A1 * 1/2019 Woodbridge .......... G06V 10/82
2025/0267088 A1 * 8/2025 Singh ...................... H04L 45/24

* cited by examiner

*Primary Examiner* — Anthony D Brown
(74) *Attorney, Agent, or Firm* — Dority & Manning, P.A.

(57) ABSTRACT

A network request is received from a network device. The network request includes firmware information indicative of a version of firmware currently installed on the network device. Based on the firmware information, a determination is made that the version of the firmware currently installed on the network device is incapable of generating valid authentication information subsequent to an expiration date that occurred prior to a current date. Responsive to the determination, configuration information is generated for the network device that includes instructions to utilize a poisoned network entity. The poisoned network entity is configured with a false current date that precedes the expiration date.

21 Claims, 5 Drawing Sheets

REMOTE RECOVERY AND RE-ESTABLISHMENT OF IDENTITY FOR NETWORK DEVICES WITH EXPIRED AUTHENTICATION VIA POISONED NETWORK SERVICES

BACKGROUND

Conventional network devices often generate authentication certificates by utilizing cryptographic techniques that bind their identity with their current firmware version. This process involves creating a digital certificate, which includes the device's identity information (e.g., the device's name, IP address, firmware version, etc.). A Certificate Authority (CA) then verifies the certificate's contents, including the firmware version, to ensure that the certificate is valid and has not been tampered with. When the network device attempts to authenticate itself, it presents this certificate to the network. The network can verify the certificate to confirm that the identity of the device is accurate, and that the version of the firmware currently installed to the device is valid. In such fashion, networks can ensure that only devices with correct and current firmware can connect to and communicate on the network, thereby enhancing security.

SUMMARY

Implementations described herein enable remote recovery and identity re-establishment for out-of-date devices via poisoned network services. More specifically, a computing system (e.g., a network computing system, a distributed network of computing devices, etc.) associated with a network service provider can receive a network request from a network device (e.g., an Internet Protocol (IP) address assignment request, etc.). The network request can include firmware information that indicates a version of firmware currently installed to the network device. The computing system can determine that the firmware is expired, and thus, the network device is incapable of generating valid authentication information. In response, the computing system can generate configuration information for the network device including instructions to utilize a poisoned network entity configured with a false current date that precedes the expiration date. Using the false current date, the network device can communicate with other poisoned network entities to update its firmware.

In one implementation, a method is provided. The method includes receiving, by a computing system comprising one or more computing devices, a network request from a network device, wherein the network request comprises firmware information indicative of a version of firmware currently installed on the network device. The method further includes, based on the firmware information, making, by the computing system, a determination that the version of the firmware currently installed on the network device is incapable of generating valid authentication information subsequent to an expiration date that occurred prior to a current date. The method further includes, responsive to the determination, generating, by the computing system, configuration information for the network device comprising instructions to utilize a poisoned network entity, wherein the poisoned network entity is configured with a false current date that precedes the expiration date.

In another implementation, a network device is provided. The network device includes a memory, and one or more processor devices coupled to the memory. The processor device(s) are to send a network request to a computing system, wherein the network request comprises firmware information indicative of a version of firmware currently installed on the network device, and wherein the version of the firmware currently installed on the network device is incapable of generating valid authentication information subsequent to an expiration date that occurred prior to a current date. The processor device(s) are further to receive, from the computing system, configuration information for the network device comprising instructions to utilize a poisoned NTP server, wherein the poisoned NTP server is configured with a false current date that precedes the expiration date. The processor device(s) are further to, responsive to the instructions to utilize the poisoned NTP server, receive, from the poisoned NTP server, instructions to replace current time information with false current time information indicative of a false current time that occurs on the false current date. The processor device(s) are further to generate valid authentication information for the network device, wherein the valid authentication information is valid for the network device on the false current date.

In another implementation, a non-transitory computer-readable storage medium is provided. The non-transitory computer-readable storage medium includes executable instructions to cause one or more processor devices to receive a network request from a network device, wherein the network request comprises firmware information indicative of a version of firmware currently installed on the network device. The instructions further cause the one or more processor devices to, based on the firmware information, make a determination that the version of the firmware currently installed on the network device is incapable of generating valid authentication information subsequent to an expiration date that occurred prior to a current date. The instructions further cause the one or more processor devices to, responsive to the determination, generate configuration information for the network device comprising instructions to utilize a poisoned network entity, wherein the poisoned network entity is configured with a false current date that precedes the expiration date.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
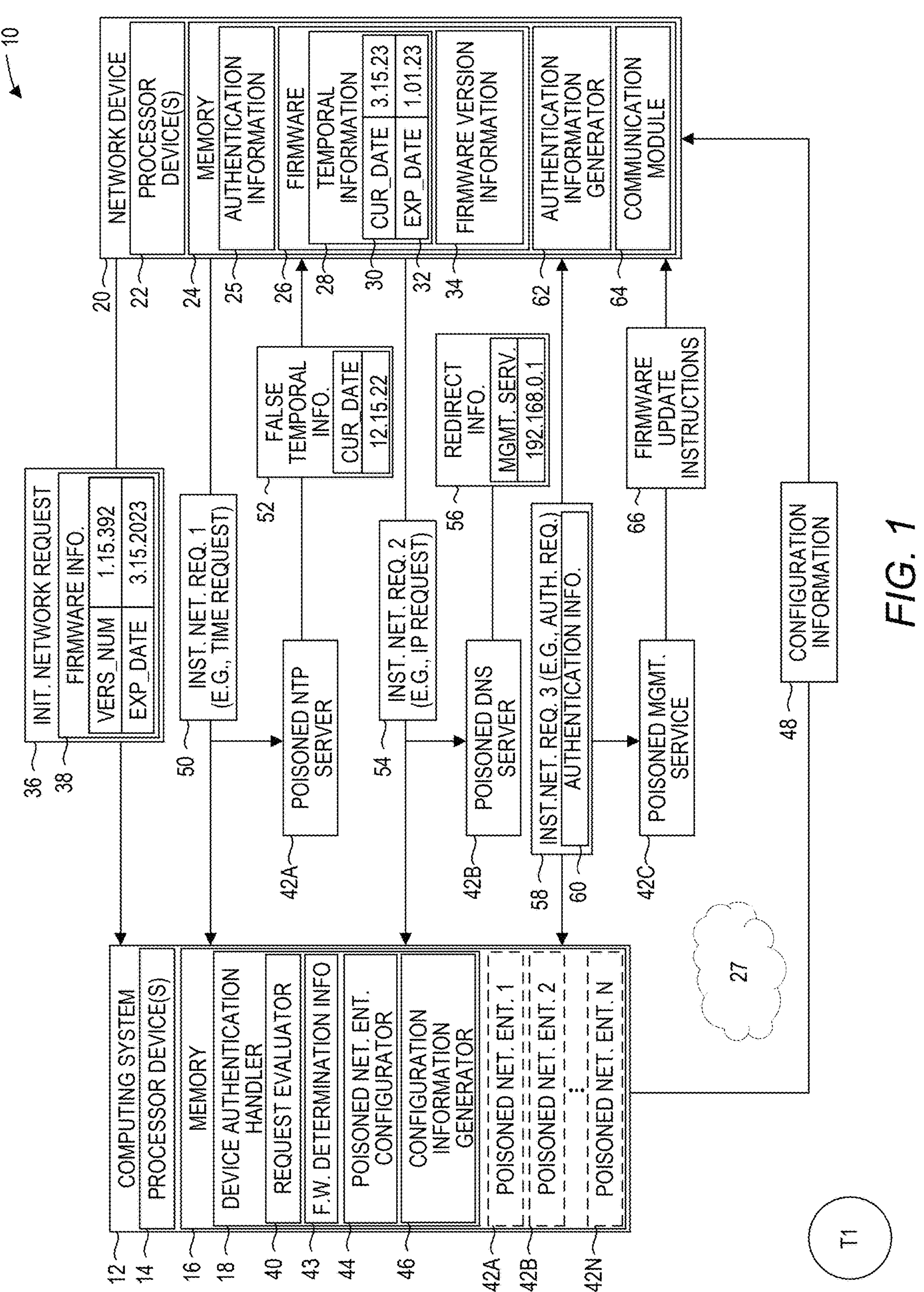
FIG. 1 is a block diagram for block diagram of a computing environment for remote recovery and identity re-establishment for out-of-date devices via poisoned network services according to some implementations of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Some network service providers (e.g., Internet Service Providers (ISPs), etc.) provide Customer Premise Equipment (CPE) to users. CPEs, which are also interchangeably referred to as "network devices" herein, are network devices that facilitate provision of network services to a user, and are generally managed using network servers or services, such as management services, control servers, etc. CPEs can connect to such servers and services using authentication certificates (e.g., Transport Layer Security (TLS)/Secure Sockets Layer (SSL) certificates, etc.). Authentication certificates are generally utilized to both encrypt traffic as well as prove the identity of the network server and/or the network device. Authentication certificates conventionally utilize a secure chain of trust, creating a traceable link back to the Certificate Authority (CA) through root certificates and intermediate certificates. It should be noted that authentication certificates may be referred to interchangeably as "authentication information" throughout the subject specification. However, authentication information is not limited to a certificate format, and can be generated using any type or manner of conventional authentication process.

Conventional network devices often generate authentication certificates by utilizing cryptographic techniques that bind their identity with their current firmware version. This process involves creating a digital certificate, which includes the device's identity information (e.g., the device's name, IP address, firmware version, etc.). The CA then verifies the certificate's contents, including the firmware version, to ensure that the certificate is valid and has not been tampered with. When the network device attempts to authenticate itself, it presents this certificate to the network. The network can verify the certificate to confirm that the identity of the device is accurate, and that the version of the firmware currently installed to the device is valid. In such fashion, networks can ensure that only devices with correct and current firmware can connect to and communicate on the network, thereby enhancing security.

As many authentication certificate generation processes are at least partially based on the current firmware version of the firmware installed to a network device, network service providers implement specific servers and services that are responsible for keeping network device firmware up-to-date. For example, management entities (e.g., servers, services, etc.) are often deployed to monitor network device firmware versioning and to instruct devices to install firmware updates as needed. Firmware versioning can also serve as a security control, as conventional firmware is often restricted from generating valid authentication certificates if the firmware is not updated after a certain amount of time. In other words, firmware that has not been updated for a certain period of time is generally incapable of generating valid authentication certificates.

As such, issues can arise when a deployed network device is unable to connect to a management entity for extended periods of time (e.g., due to lack of power, lack of connectivity, etc.). During this time the network device cannot be monitored by management entities, and thus cannot receive firmware updates. Once the network device is able to connect to management entities, the network device will send an initial request that includes authentication information for the network device. However, because the firmware installed to the network is out-of-date, the authentication information is considered invalid by the management entities.

Without a valid certificate, the network device cannot receive a firmware update. In this scenario, the network device cannot generate valid authentication information due to out-of-date firmware, but cannot update the out-of-date firmware without valid authentication information, thus rendering the device unusable. Conventionally, network service providers have been forced to choose between two substantially inefficient processes: manually retrieving and updating the network device, or writing off the network device entirely.

Accordingly, implementations described herein enable remote recovery and identity re-establishment for out-of-date devices via poisoned network services. More specifically, a computing system (e.g., a network computing system, a distributed network of computing devices, etc.) associated with a network service provider can receive a network request from a network device (e.g., an Internet Protocol (IP) address assignment request, etc.). The network request can include firmware information that indicates a version of firmware currently installed to the network device.

Based on the firmware information, the computing system can determine that the version of the firmware currently installed to the network device is incapable of generating valid authentication information after occurrence of an expiration date that occurred prior to the current date. In other words, the computing system can determine that the version of the firmware is "out-of-date" or is otherwise too old to be used to generate valid authentication information.

Responsive to the determination, the computing system can generate configuration information for the network device. The configuration information can include instructions that instruct the network device to utilize one or more poisoned network entities. As described herein, a "poisoned" network entity can refer to a network entity that is configured to knowingly provide "false" or modified information in response to a request from a particular entity or type of entity. For example, a conventional Network Time Protocol (NTP) server is configured to provide an accurate current time in response to a request. Conversely, a poisoned NTP server can be configured to provide a false or inaccurate current time in response to a request.

Poisoned network entities are often "poisoned" or otherwise configured to cause desired behaviors in target entities that interact with the poisoned network entity. In other words, poisoned network entities are configured to provide information, or perform a task, in a manner that is predicted to elicit a certain type of response from a requesting entity. In some instances, poisoned network entities can be configured to emulate prior states, such as a prior state during which the firmware installed to the network device was "up-to-date."

For example, if a network device with "out-of-date" firmware requests the current time from a conventional NTP server, the conventional NTP server will respond with an accurate current date and time. Based on the accurate current date and time, the network device will generate invalid authentication information, or will determine that it is incapable of generating valid authentication information due to the passage of an expiration date that occurred prior to the current date. In this case, the network device will be unable to update the "out-of-date" firmware and will thus remain unusable.

However, if the network device requests a poisoned NTP server, the poisoned NTP server can respond with a false current date and time that precedes the expiration date. Based on the false current date and time, the network device will generate valid authentication information, or, at least, authentication information the network device believes to be valid. The network device can then continue to perform an authentication process to re-establish an identity with the network service provider.

For example, the authentication process generally requires a network device to first contact an NTP server and then contact a Domain Name Service (DNS) server. As such, after receiving the false current time from the poisoned NTP server, the configuration information received from the computing system can instruct the network device to utilize a poisoned DNS server. Rather than implementing conventional DNS functionality, the poisoned DNS server can redirect the network device to a poisoned management server.

The poisoned management server can be configured to provide firmware update information to the network device. For example, a conventional management server that receives a firmware update request from the network device may reject the request due to the version of firmware installed to the network device, regardless of the valid authentication information generated by the network device. However, a poisoned management server can be configured to accept requests from network devices with firmware of the version currently installed to the network device. The network device can receive the firmware update information and update the firmware on the network device to a current "up-to-date" firmware version. In such fashion, implementations described herein can enable remote recovery and identity re-establishment for network devices with expired authentication via poisoned network services.

FIG. 1 is a block diagram for block diagram of a computing environment for remote recovery and identity re-establishment for out-of-date devices via poisoned network services according to some implementations of the present disclosure. More specifically, a computing environment 10 can include a computing system 12. The computing environment 10 can be any type or manner of computing environment implemented by one or more different entities. The computing environment 10 can include any type or manner of computing device, network device, network infrastructure (e.g., transceivers, splitters, cable, etc.), etc. For example, the computing environment 10 can be an environment implemented by a network service provider (e.g., an internet service provider, a telecommunications service provider, etc.), and can include various devices and infrastructure that collectively enable provision of network services.

The computing system 12 can include processor device(s) 14 and memory 16. In some implementations, the computing system 12 may be a computing system that includes multiple computing devices. Alternatively, in some implementations, the computing system 12 may be one or more computing devices within a computing environment that includes multiple distributed devices and/or systems. Similarly, the processor device(s) 14 may include any computing or electronic device capable of executing software instructions to implement the functionality described herein.

The memory 16 can be or otherwise include any device(s) capable of storing data, including, but not limited to, volatile memory (random access memory, etc.), non-volatile memory, storage device(s) (e.g., hard drive(s), solid state drive(s), etc.). In particular, the memory 16 can include a containerized unit of software instructions (i.e., a "packaged container"). The containerized unit of software instructions can collectively form a container that has been packaged using any type or manner of containerization technique.

The containerized unit of software instructions can include one or more applications, and can further implement any software or hardware necessary for execution of the containerized unit of software instructions within any type or manner of computing environment. For example, the containerized unit of software instructions can include software instructions that contain or otherwise implement all components necessary for process isolation in any environment (e.g., the application, dependencies, configuration files, libraries, relevant binaries, etc.).

The memory 16 can include a device authentication handler 18. The device authentication handler 18 can handle authentication (both provision and maintenance) for network devices, services, and other network entities implemented by or otherwise associated with the network service provider of the computing system 12. In particular, network entities within the computing environment 10 can store authentication information to authenticate an identify of the device to other devices and systems within the computing environment 10. For example, the computing environment 10 can include a network device 20. The network device 20 can store authentication information that is handled by the device authentication handler 18. To communicate with the computing system 12, the network device 20 can provide a request to the computing system that includes the authentication information. If the device authentication handler 18 determines that the authentication information is valid, the device authentication handler 18 can validate the network device 20 for subsequent communications within the computing environment 10.

The network device 20 can include processor device(s) 22 and memory 24 as described with regards to the processor device(s) 14 and the memory 16 of the computing system 12. The network device 20 can be any type or manner of network device, such as a router, switch, modem, signal booster, repeater, etc. In some implementations, the network device 20 can be a computing device within the computing environment 10, such as a smartphone, laptop, wearable device, desktop, etc. Additionally, or alternatively, in some implementations, the network device 20 can be an Internet-of-Things (IoT) device, such as a sensor, camera device, etc.

The memory 24 can include firmware 26. As described herein, "firmware" can generally refer to basic machine instructions, or a program, that is installed to, stored by, or otherwise included in the network device 20 to facilitate operations performed by the network device. Generally, firmware can be stored to or programmed into a hardware device, such as a read-only memory (ROM) of the memory 16. Alternatively, if the network device 20 is a virtual device, the firmware 26 may be implemented via software instructions, an abstraction, an emulated ROM device, etc.

Like many conventional software programs, the firmware 26 can be iteratively refined and updated over time. Updates to firmware can be referred to as "releases," and are usually assigned a particular version number. For example, the first release of firmware may have a version number of 1.0, while the first major update developed for the firmware may have a version number of 1.1. A relatively minor update developed for the firmware following the version 1.1 release may have a version number of 1.15. In such fashion, the version number for the firmware 26 can indicate the last time that the firmware 26 was updated.

The operations, events, etc. depicted by FIG. 1 can occur during a period of time T1. Prior to the period of time T1, the network device 20 can be disconnected from a network 27 implemented within the computing environment 10 for an extended period of time (e.g., weeks, months, years, etc.), and thus, incapable of communicating with the computing system 12 or any other computing systems within the computing environment 10 (or external to the computing environment 10). Updates to the firmware 26 can be released while the network device 20 is disconnected. However, because the network device 20 is disconnected from the network 27 while the updates are released, the network device 20 cannot be informed of the firmware updates and thus cannot receive and apply the updates to the firmware 26. As such, the firmware 26 can be one, or more, versions out-of-date in comparison to the most recent release of the firmware 26.

The memory 24 can include initial authentication information 25. The initial authentication information 25 can be used to authenticate the identity of the network device 20 to other devices and systems within the computing environment 10. For example, the initial authentication information 25 can be a certificate, encoding, key, value, etc. that proves the identity of the network device 20. In some instances, the initial authentication information 25 can be included in the firmware 26, and can be updated or provided when the firmware 26 is updated. Additionally, or alternatively, in some instances, the firmware can be at least partially utilized to generate the initial authentication information 25. For example, the firmware 26 can be a hash value produced by a hash function that takes at least the current version number for the firmware 26 as an input.

Alternatively, in some instances, the initial authentication information 25 can be separate from the firmware 26. However, it should be noted that the firmware 26, or the version number for the firmware 26, can still be utilized by the device authentication handler 18 as a heuristic to determine whether the initial authentication information 25 is valid. For example, if the version number for the firmware 26 indicates that the firmware 26 is out-of-date by more than a year, the device authentication handler 18 may determine that the initial authentication information 25 is invalid because the initial authentication information 25 is configured to expire after one year, and only up-to-date firmware can obtain authentication information.

The firmware 26 can include temporal information 28. The temporal information 28 can include current date and time information 30. The current date and time information 30 can indicate a current date and current time, and can be determined by requesting temporal information from particular services, such as Network Time Protocol (NTP) services or servers. The current date and time information 30 can be stored using any conventional format, technique, time zone, etc.

The temporal information 28 can also include expiration information 32. The expiration information 32 can indicate a date and/or time (i.e., an "expiration date") at which the firmware 26 can no longer be used to generate authentication information. In some implementations, the temporal information 28 can include a date, such as a release date for the version of the firmware 26 installed to the network device 20, from which the expiration information 32 can be derived. For example, if the release date for the firmware 26 is Jan. 1, 2022, and authentication certificates expire after 1 year, the expiration information 32 can indicate a date of Jan. 1, 2023.

The memory 24 of the network device 20 (and/or the firmware 26 itself) can include firmware version information 34. The firmware version information 34 can include a version number for the firmware 26 currently executed by the network device 20. Additionally, in some implementations, the firmware version information 34 can also include temporal information related to the firmware version number, such as a release date for the version of the firmware 26, a date upon which the firmware 267 was last updated, a list of firmware components or ancillary firmware-like software instructions (e.g., drivers, software mitigations for CPU vulnerabilities, encryption algorithms, etc.). In this manner, specific portions of the firmware 26 can be updated if updating of those specific portions is sufficient to re-establish the identity of the network device 20 with the computing system 12.

As described previously, the operations depicted in FIG. 1 can occur during a period of time T1, and prior to the period of time T1, the network device 20 can be disconnected from, or otherwise lack the capability to communicate on, the network 27 for an extended period of time. For example, the network device 20 may be deployed to a vacation home that is only used once a year, or may be deployed to a home that switches network service providers and thus disconnects the network device 20. During the time T1, access to the network 27 can be restored to the network device 20.

Upon restoration of access to the network 27, the network device 20 can send an initial network request 36 to the computing system 12. The network device 20 can be configured to create some type of initial request upon restoration of network access, and the type of request made can vary based on the type of network device. As such, the network device 20 can make any type or manner of initial request to the computing system 12, such as an IP address request, DHCP request, etc.

The initial network request 36 can include firmware information 38. The firmware information 38 can include some, or all, of the current date and time information 30, the expiration information 32, and/or the firmware version information 34. For example, the firmware information 38 can include the expiration date from the expiration information 32 and a version number from the firmware version information 34. Alternatively, in some implementations, the firmware information 38 can be derived from the temporal information 28 and/or the firmware version information 34. For example, the firmware information 38 may be an encoding or hash that is derived from the firmware version number of the firmware version information 34 and the current date from the current date and time information 30.

The device authentication handler 18 of the computing system 12 can include a request evaluator 40. The request evaluator 40 can evaluate the initial network request 36 to generate firmware determination information 43. The firmware determination information 43 can indicate whether the firmware 26 of the network device 20 is capable of generating valid authentication information after occurrence of an expiration date that occurred prior to the current date. For example, assume that the firmware 26 is capable of creating valid authentication information for one year following the release of the version of the firmware 26. Further assume that two years have passed since the network device 20 last connected to the network 27. In this instance, the firmware determination information 43 can indicate that the firmware 26 is incapable of generating valid authentication information.

Additionally, or alternatively, in some implementations, the request evaluator 40 can determine that the firmware 26 is incapable of creating valid authentication information even if the firmware 26 itself has not "expired." To follow the previous example, assume that only six months have passed since the release of the version of the firmware 26. Further assume that the version of the firmware 26 uses a particular encryption scheme to generate valid authentication information. If a security vulnerability in the particular encryption scheme was discovered in the past six months, the request evaluator 40 may determine that the firmware 26 is incapable of creating valid authentication information due to the security vulnerability discovered in the encryption scheme, even if the firmware 26 itself is valid. This process can also occur for other types of security vulnerabilities, such a driver vulnerabilities, hardware vulnerabilities, network vulnerabilities, etc.

In some implementations, the memory 16 of the computing system 12 can include a poisoned network entity configurator 44. The poisoned network entity configurator 44 can configure poisoned network entities 42A-42N (generally, poisoned network entities 42). The poisoned network entities 42 can be network entities that are "poisoned" (i.e., purposely configured) to purposely provide "false" or modified information in response to a request from a particular entity or type of entity (e.g., network devices with expired firmware).

In some implementations, the poisoned network entities 42 can be network devices or services implemented by the computing system 12. For example, the computing system 12 can be a collection of distributed computing devices and systems that include and/or implement some (or all) of the poisoned network entities 42. Additionally, or alternatively, in some implementations, the poisoned network entities 42 can be devices or services within the computing environment that are implemented using device(s) other than the computing system 12.

The poisoned network entity configurator 44 can configure the poisoned network entities 42 to cause desired behaviors in the network device 20 and other network devices that interact with the poisoned network entities 42. In other words, the poisoned network entity configurator 44 can configure the poisoned network entities 42 to provide information, or perform a task, in a manner that is predicted to elicit a certain type of response from a requesting entity. In some instances, the poisoned network entities 42 can be configured to emulate prior states, such as a prior state during which the firmware installed to the network device was "up-to-date."

To follow the depicted example, the device authentication handler 18 can include a configuration information generator 46. The configuration information generator 46 can generate configuration information 48 for the network device 20. The configuration information 48 can include instructions to utilize one or more of the poisoned network entities 42 in place of "conventional" network entities the network device 20 may utilize to re-establish identity with the computing system 12.

More specifically, the network device 20 can include a programmed routine, or set of operations, to perform to re-establish a valid and authenticated identity with the computing system 12. The routine can include sending requests to particular network entities. For example, the routine may include sending a time request to an NTP server to obtain a current time, sending an IP address request to a DNS server to receive an IP address, etc. The configuration information 48 can instruct the network device 20 to utilize the poisoned network entities 42, rather than "conventional" network entities, when performing this routine. In such fashion, the computing system 12 can cause the network device 20 to avoid interactions with network entities that might provide a response that disrupts the routine performed by the network device 20 (e.g., receiving a correct current date, etc.).

In particular, the configuration information 48 can instruct the network device 20 to utilize a poisoned NTP server 42A for a time request. In response, the network device 20 can provide a first instructed network request 50 to the poisoned NTP server 42A. The first instructed network request 50 can request a current time from the poisoned NTP server 42A. However, the poisoned NTP server 42A can be configured by the poisoned network entity configurator 44 to report a false current date rather than a correct current date.

Specifically, the poisoned NTP server 42A can provide false temporal information 52 to the network device 20 in response to the first instructed network request 50. The network device 20 can ingest the false temporal information 52, and continue the routine described previously based on the false temporal information 52. For example, assume that a "correct" or accurate current date is Jan. 1, 2023, and the expiration date information indicates an expiration date for the firmware 26 of May 31, 2022. Given accurate temporal information, the network device 20 may determine that the firmware has expired and, in response, cease performance of the routine to re-establish identity with the computing system 12. However, the false temporal information can indicate a false current date (e.g., Jun. 1, 2022) that occurs prior to the expiration date of May 31, 2022. Based on the false temporal information 52, the network device can determine that the firmware 26 has not expired, and can continue the routine to re-establish identity with the computing system 12.

The configuration information 48 can instruct the network device 20 to utilize a poisoned DNS server 42B for an IP address request that typically follows a time request. After receiving the false temporal information 52, the network device 20 can send a second instructed network request 54 (e.g., an IP address request) to a poisoned DNS server 42B indicated by the configuration information 48. In response to an IP request, a conventional DNS server can provide DNS information and redirect the network device 20 to a conventional management service. A management service, as described herein, can generally refer to any type of network device or network service that provides network management functionality (e.g., managing assignment of devices to owners, managing allocation of network resources, etc.).

Conversely, the poisoned DNS server 42B can provide redirection information 56 to the network device 20 that redirects the network device 20 to a poisoned network management service 42C. In response, the network device 20 can provide an authentication request 58 to the poisoned management service 42C. The authentication request 58 can include authentication information 60. The authentication information 60 can be authentication information that is valid on the false current date indicated by the false temporal information 52.

The authentication information 60 can be generated using an authentication information generator 62 of the memory 24 of the network device 20. The memory 24 of the network device 20 can also include a communication module 64 to generate and send network requests (e.g., requests 38, 50, 54, 58, etc.).

The poisoned management service 42C can be configured (e.g., by the poisoned network entity configurator 44) to provide firmware update instructions 66 to network devices with authentication information that would be valid false current date indicated by the false temporal information 52. The network device 20 can update the firmware 26 based on the firmware update instructions 66. In such fashion, implementations described herein can enable remote recovery and identity re-establishment for network devices with expired authentication via poisoned network services.

In some implementations, the poisoned network entity configurator 44 can configure the poisoned network entities 42 dynamically in response to the initial network request 36. For example, assume that the firmware information 38 included in the initial network request 36 indicates an expiration date of Mar. 15, 2023. The poisoned network entity configurator 44 can determine a false current date that occurs prior to the expiration date, such as Jan. 1, 2023. The poisoned network entity configurator 44 can then dynamically configure the poisoned NTP server 42A to report the false current date within the false temporal information 52. For another example, the poisoned network entity configurator 44 can configure the poisoned management service 42C to accept the authentication information 60 as valid (e.g., by informing the poisoned management service 42C that the current date is the false current date indicated by the false temporal information 52.

In some implementations, one of the poisoned network entities 42 can be utilized to at least partially configure another of the poisoned network entities 42. For example, the poisoned NTP server 42A can also report the false temporal information 52 to the poisoned management service 42C. In this manner, the poisoned management service 42C can be configured to accept the authentication information 60 as valid.

Alternatively, in some implementations, the poisoned network entity configurator 44 can "pre-configure" multiple poisoned network entities to handle different versions of the firmware 26. For example, assume that poisoned network entities 42D and 42E (not explicitly illustrated) are also poisoned NTP servers along with the poisoned NTP server 42A. The poisoned NTP servers 42A, 42D, and 42E can each be assigned to report different false temporal information. For example, the poisoned NTP server 42A can be configured to report false temporal information of Jan. 1, 2023 for a firmware version that expires on May 1, 2023, while the poisoned NTP server 42D can be configured to report false temporal information of Jan. 1, 2022 for a firmware version that expires on Nov. 23, 2022.

In some implementations, the poisoned network entity configurator 44 can instantiate and/or configure the poisoned network entities 42 in response to the release of a new version of the firmware 26. For example, assume that a new version of the firmware 26 is released by a firmware-creating entity. The firmware-creating entity can provide firmware reporting information to the poisoned network entity configurator 44 indicating that the new version of the firmware 26 will expire in one year. In response, the poisoned network entity configurator 44 can instantiate and/or configure the poisoned network entities 42 to report a false information corresponding to the expiration date indicated by the new version of the firmware 26.

It should be noted that, in some implementations, the poisoned network entity configurator 44 can instantiate and/or configure the poisoned network entities 42 to handle multiple types of firmware and/or network devices. For example, the poisoned NTP server 42A can be configured to generate the false temporal information 52 dynamically such that the false temporal information 52 is ingestible by the requesting network device.

Figure 2:
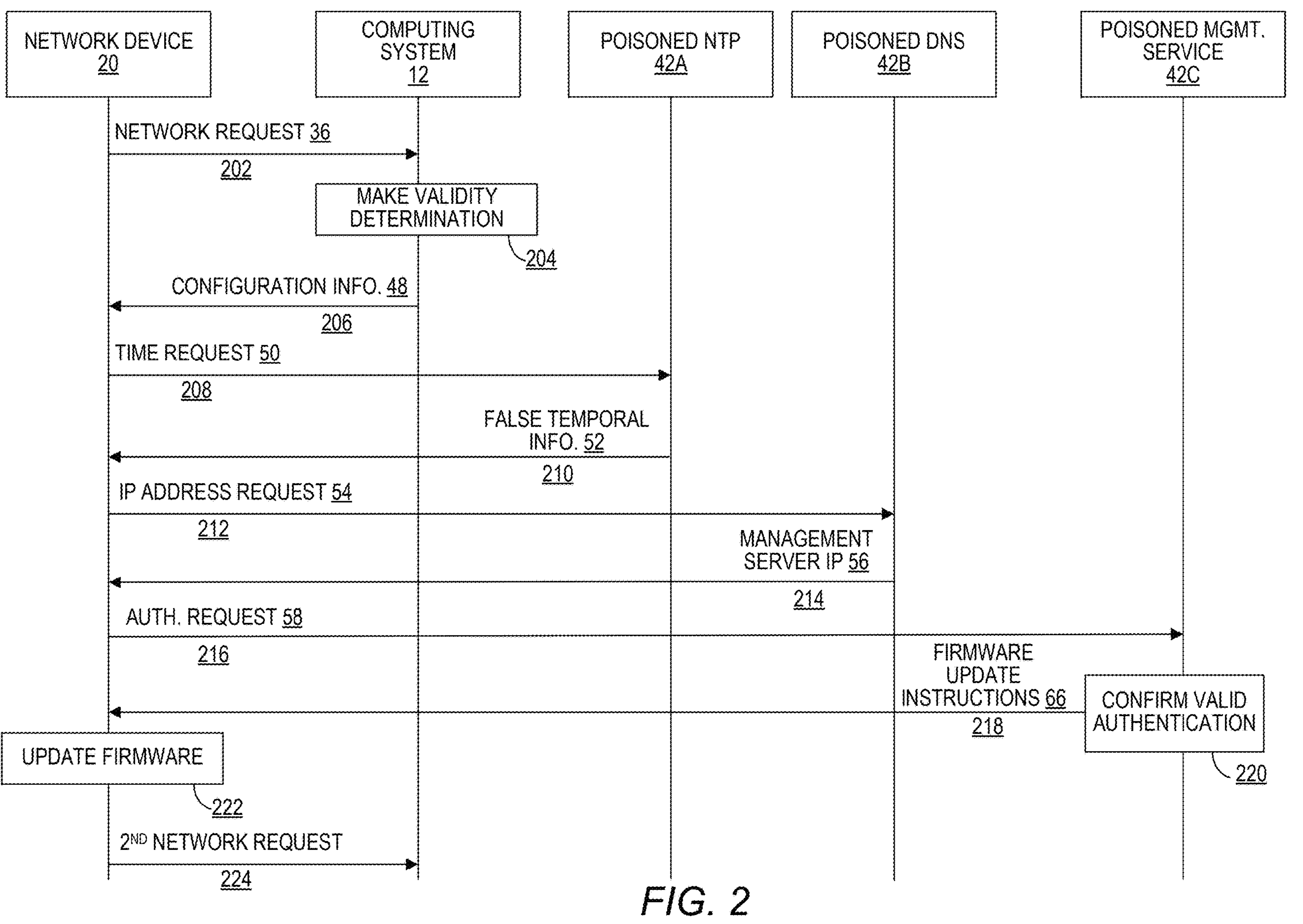
FIG. 2 is a sequence flow diagram for remote recovery and identity re-establishment for out-of-date devices via poisoned network services according to some implementations of the present disclosure.

FIG. 2 is a sequence flow diagram for remote recovery and identity re-establishment for out-of-date devices via poisoned network services according to some implementations of the present disclosure. FIG. 2 will be discussed in conjunction with FIG. 1. Specifically, at 202, the network device 20 can send an initial network request 36 to the computing system 12 (or a server or device implemented or otherwise associated with the computing system 12, such as an NTP server, DHCP service, etc.). The initial network request 36 can include the firmware information 38.

At 204, the computing system 12 can make a validity determination. More specifically, the computing system 12 can, based on the firmware information 38, make a determination that the version of the firmware 26 currently installed to the network device 20 is incapable of generating valid authentication information after occurrence of an expiration date that occurred prior to a current date.

At 206, the computing system 12 can provide the configuration information 48 to the network device 20. The configuration information 48 can include instructions to utilize a poisoned network entity (e.g., the poisoned NTP server 42A, etc.). The poisoned network entity 42 can be configured with a false current date that precedes the expiration date.

At 208, the network device 20 can provide the first instructed network request 50 (i.e., time request) to the poisoned NTP server 42A. In response, at 210, the poisoned NTP server 42A can provide false temporal information (i.e., a false current time) to the network device 20.

At 212, based on the false temporal information 52 and the configuration information 48, the network device 20 can provide the second instructed network request 54 (i.e., an IP address request) to the poisoned DNS server 42B. In response, at 214, the poisoned DNS server 42B can provide redirection information 56 (i.e., an IP address for the poisoned management server 42C) to the network device that redirects the network device 20 to the poisoned management service 42C.

At 216, in response to receiving the redirect information 56, the network device 20 can provide the third instructed network request (i.e., an authentication request) to the poisoned management service 42C. In response, at 218, the poisoned management service 42C can authenticate the authentication request. At 220, once authenticated, the poisoned management service 42C can provide firmware update instructions 66 to the network device 20.

At 222, the network device 20 can update the firmware 26 based on the firmware update instructions 66. At 224, the network device 20 can generate a second network request that includes second authentication information generated using the current or "up-to-date" version of the firmware 26. As the second authentication information is generated using a version of the firmware 26 that is updated based on the firmware update instructions 66, and is thus capable of generating valid authentication information, the computing system 12 can validate the second authentication information as valid.

Figure 3:
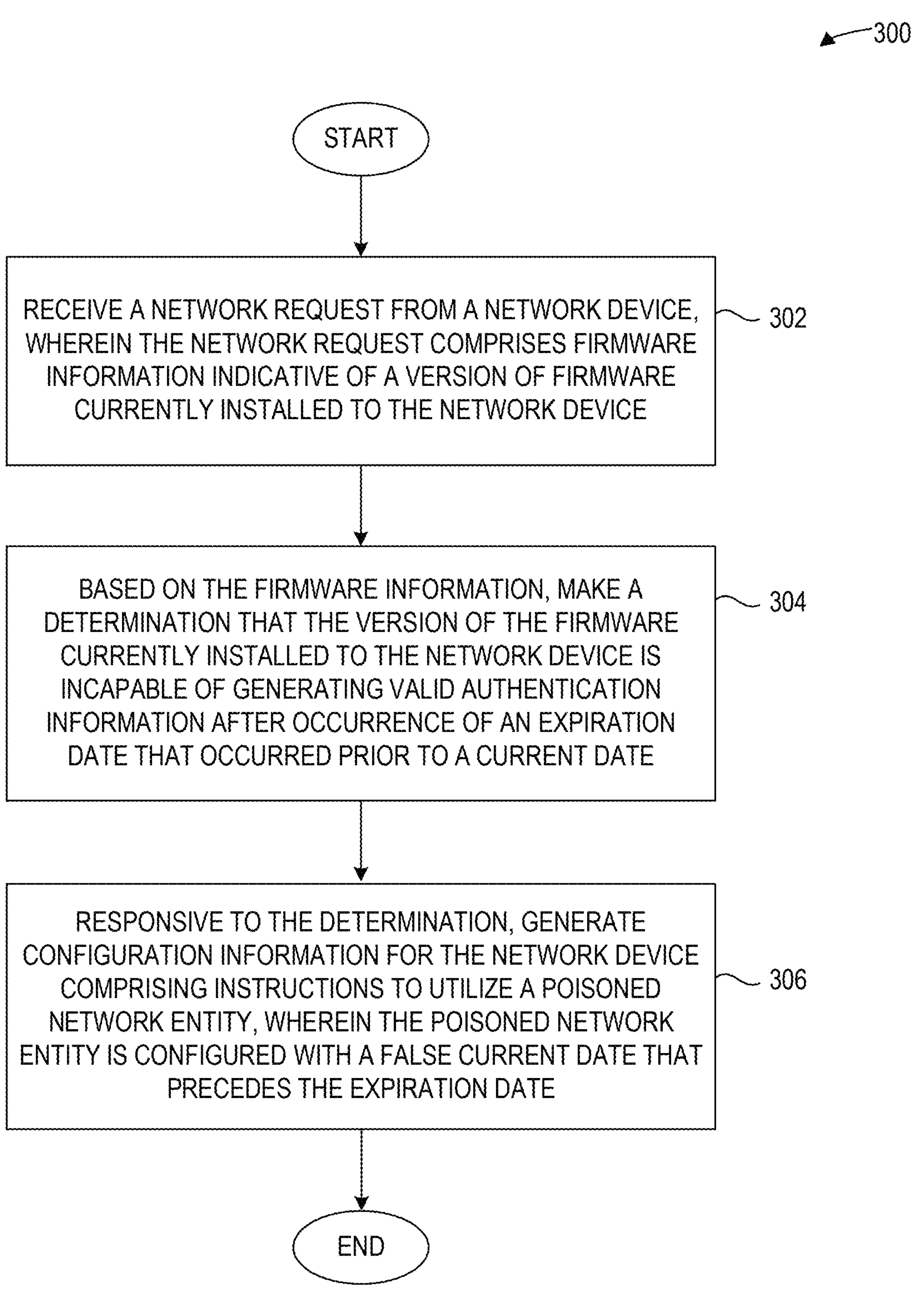
FIG. 3 depicts a flow chart diagram of an example method for a computing system to remotely recover and re-establish the identity of out-of-date devices via poisoned network services according to some implementations of the present disclosure.

FIG. 3 depicts a flow chart diagram of an example method 300 for a computing system to remotely recover and re-establish the identity of out-of-date devices via poisoned network services according to some implementations of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can receive a network request from a network device. The network request can include firmware information indicative of a version of firmware currently installed to the network device. In some implementations, the network request can include an IP address assignment request. The IP address assignment request can include a Dynamic Host Configuration Protocol (DHCP) request.

At 304, the computing system can, based on the firmware information, make a determination that the version of the firmware currently installed to the network device is incapable of generating valid authentication information after occurrence of an expiration date that occurred prior to a current date.

At 306, the computing system can, responsive to the determination, generate configuration information for the network device that include instructions to utilize a poisoned network entity. The poisoned network entity can be configured with a false current date that precedes the expiration date. In some implementations, the poisoned network entity can be implemented using at least one of the one or more computing devices of the computing system.

In some implementations, the computing system can provide the configuration information to the network device. In some implementations, to generate the configuration information, the computing system can generate the configuration information that includes instructions to utilize a set of poisoned network entities, each being configured based on the false current date that precedes the expiration date.

In some implementations, the set of poisoned network entities can include a poisoned NTP server. The computing system can generate configuration information for the network device that includes instructions to utilize the poisoned NTP server. The poisoned NTP server can be configured to report a false current time that occurs on the false current date. Additionally, or alternatively, in some implementations, the set of poisoned network entities can include a poisoned DNS server. To generate the configuration information for the network device, the computing system can generate configuration information for the network device that includes instructions to utilize the poisoned DNS server. The poisoned DNS server can be configured to redirect the network device to a poisoned management service implemented by the computing system that is configured to update the firmware currently installed to the network device.

In some implementations, generating the configuration information for the network device that includes the instructions to utilize the poisoned DNS server can include receiving, via the poisoned management service implemented by the computing system, a firmware update request that includes authentication information for the network device. The computing system can determine that the authentication information for the network device is valid for the network device on the false current date. Responsive to determining that the authentication information for the network device is valid, the computing system can provide firmware update information to the network device via the poisoned management service. The computing system can receive a second network request from the network device. The second network request can include authentication information that is valid for the network device on the current date.

Figure 4:
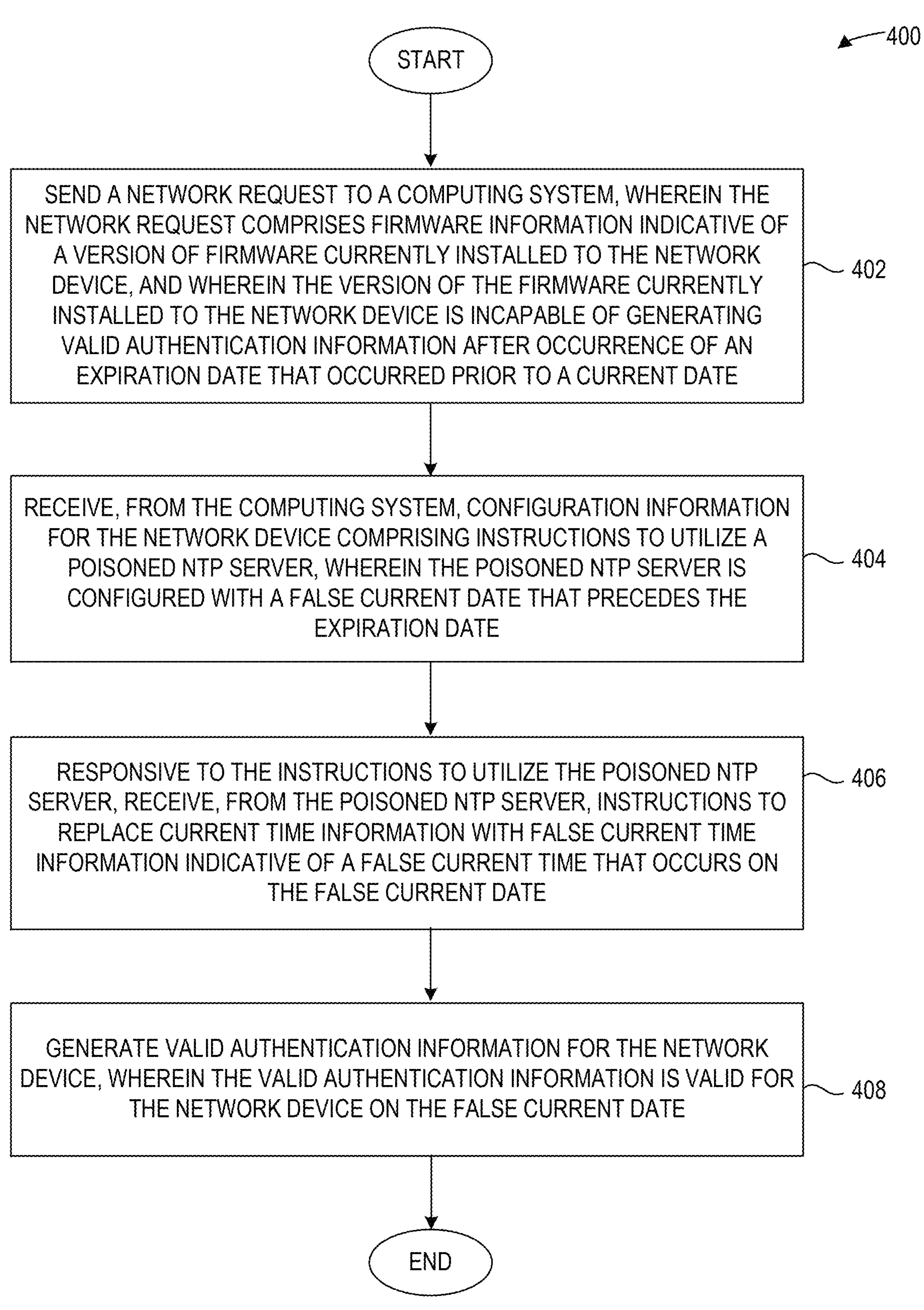
FIG. 4 depicts a flow chart diagram of an example method for remote recovery and re-establishment of the identity of an out-of-date network device via poisoned network services according to some implementations of the present disclosure.

FIG. 4 depicts a flow chart diagram of an example method 400 for remote recovery and re-establishment of the identity of an out-of-date network device via poisoned network services according to some implementations of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a network device can send a network request to a computing system. The network request can include firmware information indicative of a version of firmware currently installed to the network device. The version of the firmware currently installed to the network device can be incapable of generating valid authentication information after occurrence of an expiration date that occurred prior to a current date (i.e., an expiration date that has already passed or occurred).

At 404, the network device can receive, from the computing system, configuration information for the network device that includes instructions to utilize a poisoned NTP server. The poisoned NTP server can be configured with a false current date that precedes the expiration date. In some implementations, the configuration information can include instructions to utilize a poisoned DNS server configured to redirect a request from the network device to a poisoned management service (e.g., a service implemented by the computing system, etc.). The poisoned management service can be configured to update the firmware of the network device. In some implementations, the network request can include an IP address assignment request. Additionally, or alternatively, in some implementations, the IP address assignment request can include a DHCP request.

At 406, the network device can, responsive to the instructions to utilize the poisoned NTP server, receive, from the poisoned NTP server, instructions to replace current time information with false current time information indicative of a false current time that occurs on the false current date.

At 408, the network device can generate valid authentication information for the network device. The valid authentication information can be valid for the network device on the false current date. In some implementations, to generate the valid authentication information for the network device, the network device can provide a request to the poisoned DNS server. The request can include the valid authentication information. The network device can, responsive to providing the request, receive an update for the firmware currently installed to the network device from the poisoned management service.

Figure 5:
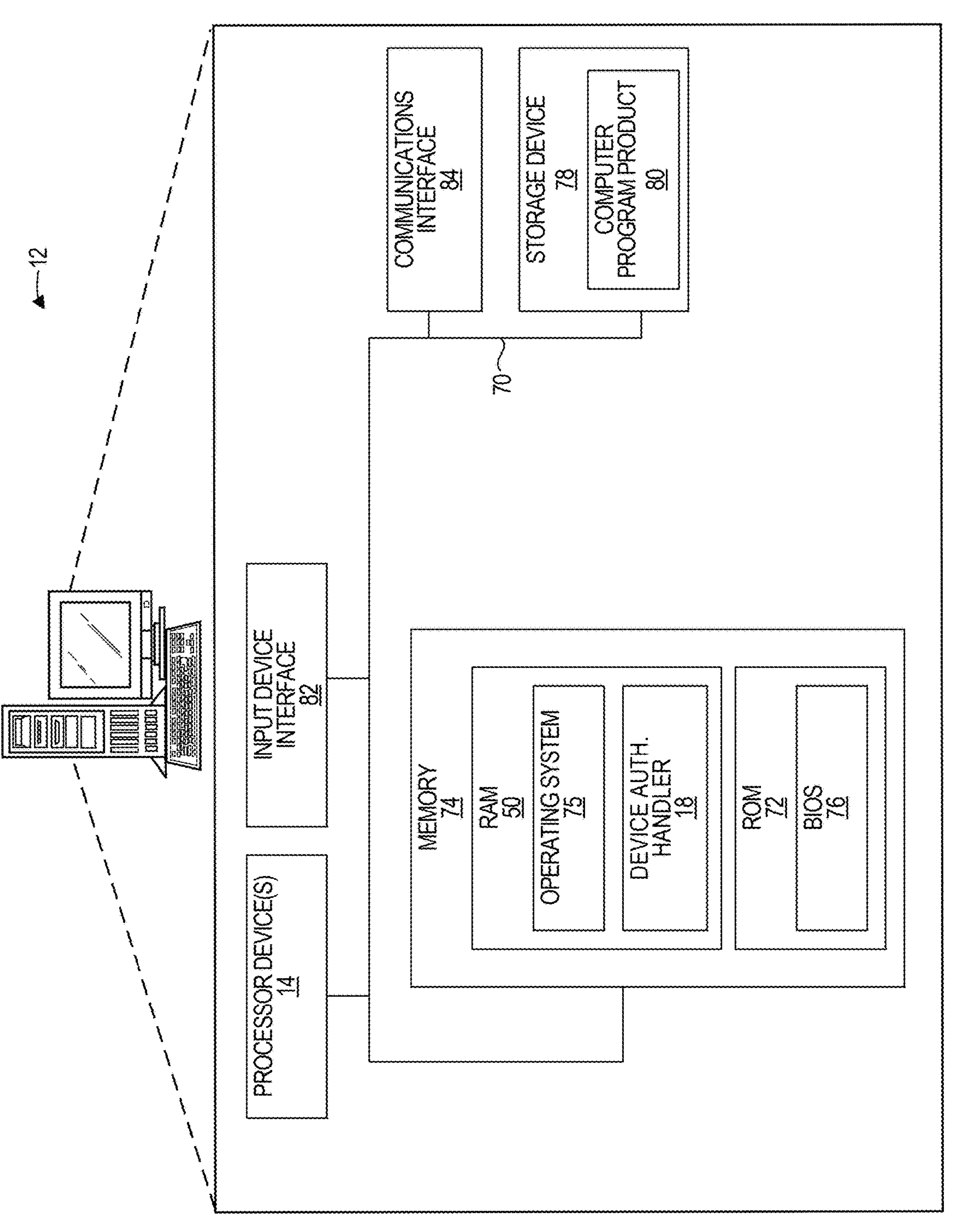
FIG. 5 is a block diagram of the computing system suitable for implementing examples according to one example.

FIG. 5 is a block diagram of the computing system 12 suitable for implementing examples according to one example. The computing system 12 may comprise any computing or electronic device capable of including firmware, hardware, and/or executing software instructions to implement the functionality described herein, such as a computer server, a desktop computing device, a laptop computing device, a smartphone, a computing tablet, or the like. The computing system 12 includes the processor device (s) 14, the memory 16, and a system bus 70. The system bus 70 provides an interface for system components including, but not limited to, the memory 16 and the processor device (s) 14. The processor device(s) 14 can be any commercially available or proprietary processor.

The system bus 70 may be any of several types of bus structures that may further interconnect to a memory bus (with or without a memory controller), a peripheral bus, and/or a local bus using any of a variety of commercially available bus architectures. The memory 16 may include non-volatile memory 72 (e.g., read-only memory (ROM), erasable programmable read-only memory (EPROM), electrically erasable programmable read-only memory (EEPROM), etc.), and volatile memory 74 (e.g., random-access memory (RAM)). A basic input/output system (BIOS) 76 may be stored in the non-volatile memory 72 and can include the basic routines that help to transfer information between elements within the computing system 12. The volatile memory 74 may also include a high-speed RAM, such as static RAM, for caching data.

The computing system 12 may further include or be coupled to a non-transitory computer-readable storage medium such as the storage device 78, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 78 and other drives associated with computer-readable media and computer-usable media may provide non-volatile storage of data, data structures, computer-executable instructions, and the like.

A number of modules can be stored in the storage device 78 and in the volatile memory 74, including an operating system 75 and one or more program modules, such as the device authentication handler 18, which may implement the functionality described herein in whole or in part. All or a portion of the examples may be implemented as a computer program product 80 stored on a transitory or non-transitory computer-usable or computer-readable storage medium, such as the storage device 78, which includes complex programming instructions, such as complex computer-readable program code, to cause the processor device(s) 14 to carry out the steps described herein. Thus, the computer-readable program code can comprise software instructions for implementing the functionality of the examples described herein when executed on the processor device(s) 14. The processor device(s) 14, in conjunction with the device authentication handler 18 in the volatile memory 74, may serve as a controller, or control system, for the computing system 12 that is to implement the functionality described herein.

Because the device authentication handler 18 is a component of the computing system 12, functionality implemented by the device authentication handler 18 may be attributed to the computing system 12 generally. Moreover, in examples where the device authentication handler 18 comprises software instructions that program the processor device(s) 14 to carry out functionality discussed herein, functionality implemented by the device authentication handler 18 may be attributed herein to the processor device(s) 14.

An operator, such as a user, may also be able to enter one or more configuration commands through a keyboard (not illustrated), a pointing device such as a mouse (not illustrated), or a touch-sensitive surface such as a display device. Such input devices may be connected to the processor device(s) 14 through an input device interface 82 that is coupled to the system bus 70 but can be connected by other interfaces such as a parallel port, an Institute of Electrical and Electronic Engineers (IEEE) 1394 serial port, a Universal Serial Bus (USB) port, an IR interface, and the like. The system 12 may also include the communications interface 84 suitable for communicating with the network 27 as appropriate or desired. The computing system 12 may also include a video port configured to interface with a display device, to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:

receiving, by a computing system comprising one or more computing devices, a network request from a network device, wherein the network request comprises firmware information indicative of a version of firmware currently installed on the network device;

based on the firmware information, making, by the computing system, a determination that the version of the firmware currently installed on the network device is incapable of generating valid authentication information subsequent to an expiration date that occurred prior to a current date; and responsive to the determination, generating, by the computing system, configuration information for the network device comprising instructions to utilize a poisoned network entity, wherein the poisoned network entity comprises a poisoned Domain Name Services (DNS) server, wherein the poisoned DNS server is configured to redirect the network device to a poisoned management service implemented by the computing system, wherein the poisoned management service and the poisoned DNS server are configured with a false current date that precedes the expiration date, and wherein the poisoned management service is further configured to update the firmware currently installed on the network device.

2. The method of claim 1, further comprising:

providing, by the computing system, the configuration information to the network device.

3. The method of claim 1, wherein generating the configuration information for the network device comprising the instructions to utilize the poisoned network entity comprises:

generating, by the computing system, the configuration information for the network device, wherein the configuration information comprises instructions to utilize a set of poisoned network entities, each poisoned network entity of the set of poisoned network entities being configured based on the false current date that precedes the expiration date.

4. The method of claim 1, wherein generating the configuration information for the network device comprising the instructions to utilize the poisoned DNS server further comprises:

receiving, by the computing system via the poisoned management service implemented by the computing system, a firmware update request comprising authentication information for the network device;

determining, by the computing system, that the authentication information for the network device is valid for the network device on the false current date; and responsive to determining that the authentication information for the network device is valid, providing, by the computing system, firmware update information to the network device via the poisoned management service.

5. The method of claim 4, wherein the method further comprises:

receiving, by the computing system, a second network request from the network device, wherein the second network request comprises valid authentication information that is valid for the network device on the current date.

6. The method of claim 1, wherein the network request comprises an Internet Protocol (IP) address assignment request.

7. The method of claim 6, wherein the IP address assignment request comprises a Dynamic Host Configuration Protocol (DHCP) request.

8. The method of claim 1, wherein the poisoned network entity is implemented using at least one of the one or more computing devices of the computing system.

9. A network device, comprising:

a memory; and one or more processor devices coupled to the memory to:

send a network request to a computing system, wherein the network request comprises firmware information indicative of a version of firmware currently installed on the network device, and wherein the version of the firmware currently installed on the network device is incapable of generating valid authentication information subsequent to an expiration date that occurred prior to a current date;

receive, from the computing system, configuration information for the network device comprising instructions to utilize a poisoned Network Time Protocol (NTP) server, wherein the poisoned NTP server is configured with a false current date that precedes the expiration date, wherein the configuration information further comprises instructions to utilize a poisoned Domain Name Services (DNS) server configured to redirect a request from the network device to a poisoned management service, and wherein the poisoned management service is configured to update the firmware of the network device;

responsive to the instructions to utilize the poisoned NTP server, receive, from the poisoned NTP server, instructions to replace current time information with false current time information indicative of a false current time that occurs on the false current date; and generate valid authentication information for the network device, wherein the valid authentication information is valid for the network device on the false current date.

10. The network device of claim 9, wherein, to generate the valid authentication information for the network device, the one or more processor devices are further to:

provide a request to the poisoned DNS server, wherein the request to the poisoned DNS server comprises the valid authentication information; and responsive to providing the request to the poisoned DNS server, receive, from the poisoned management service, an update for the firmware currently installed on the network device.

11. The network device of claim 9, wherein the network request comprises an Internet Protocol (IP) address assignment request.

12. The network device of claim 11, wherein the IP address assignment request comprises a Dynamic Host Configuration Protocol (DHCP) request.

13. A non-transitory computer-readable storage medium that includes executable instructions to cause one or more processor devices to:

receive a network request from a network device, wherein the network request comprises firmware information indicative of a version of firmware currently installed on the network device;

based on the firmware information, make a determination that the version of the firmware currently installed on the network device is incapable of generating valid authentication information subsequent to an expiration date that occurred prior to a current date; and responsive to the determination, generate configuration information for the network device comprising instructions to utilize a poisoned network entity, wherein the poisoned network entity comprises a poisoned Network Time Protocol (NTP) server, and wherein the poisoned NTP server is configured to report a false current time that occurs on a false current date that precedes the expiration date.

14. The non-transitory computer-readable storage medium of claim 13, wherein the one or more processor devices are further to:

provide the configuration information to the network device.

15. The non-transitory computer-readable storage medium of claim 13, wherein, to generate the configuration information for the network device comprising the instructions to utilize the poisoned network entity, the one or more processor devices are to:

generate the configuration information for the network device, wherein the configuration information comprises instructions to utilize a set of poisoned network entities, each poisoned network entity of the set of poisoned network entities being configured based on the false current date that precedes the expiration date.

16. A computing system, comprising:

a memory; and one or more processor devices coupled to the memory to:

receive a network request from a network device, wherein the network request comprises firmware information indicative of a version of firmware currently installed on the network device;

based on the firmware information, make a determination that the version of the firmware currently installed on the network device is incapable of generating valid authentication information subsequent to an expiration date that occurred prior to a current date; and responsive to the determination, generate configuration information for the network device comprising instructions to utilize a poisoned network entity, wherein the poisoned network entity comprises a poisoned Domain Name Services (DNS) server, wherein the poisoned DNS server is configured to redirect the network device to a poisoned management service implemented by the computing system, wherein the poisoned management service and the poisoned DNS server are configured with a false current date that precedes the expiration date, and wherein the poisoned management service is further configured to update the firmware currently installed on the network device.

17. A non-transitory computer-readable storage medium that includes executable instructions to cause one or more processor devices of a computing system to:

receive a network request from a network device, wherein the network request comprises firmware information indicative of a version of firmware currently installed on the network device;

based on the firmware information, make a determination that the version of the firmware currently installed on the network device is incapable of generating valid authentication information subsequent to an expiration date that occurred prior to a current date; and responsive to the determination, generate configuration information for the network device comprising instructions to utilize a poisoned network entity, wherein the poisoned network entity comprises a poisoned Domain Name Services (DNS) server, wherein the poisoned DNS server is configured to redirect the network device to a poisoned management service implemented by the computing system, wherein the poisoned management service and the poisoned DNS server are configured with a false current date that precedes the expiration date, and wherein the poisoned management service is further configured to update the firmware currently installed on the network device.

18. A method, comprising:

sending, by a network device comprising one or more processor devices, a network request to a computing system, wherein the network request comprises firmware information indicative of a version of firmware currently installed on the network device, and wherein the version of the firmware currently installed on the network device is incapable of generating valid authentication information subsequent to an expiration date that occurred prior to a current date;

receiving, from the computing system, configuration information for the network device comprising instructions to utilize a poisoned Network Time Protocol (NTP) server, wherein the poisoned NTP server is configured with a false current date that precedes the expiration date, wherein the configuration information further comprises instructions to utilize a poisoned Domain Name Services (DNS) server configured to redirect a request from the network device to a poisoned management service, and wherein the poisoned management service is configured to update the firmware of the network device;

responsive to the instructions to utilize the poisoned NTP server, receiving, from the poisoned NTP server, instructions to replace current time information with false current time information indicative of a false current time that occurs on the false current date; and generating valid authentication information for the network device, wherein the valid authentication information is valid for the network device on the false current date.

19. A non-transitory computer-readable storage medium that includes executable instructions to cause one or more processor devices of a network device to:

send a network request to a computing system, wherein the network request comprises firmware information indicative of a version of firmware currently installed on the network device, and wherein the version of the firmware currently installed on the network device is incapable of generating valid authentication information subsequent to an expiration date that occurred prior to a current date;

receive, from the computing system, configuration information for the network device comprising instructions to utilize a poisoned Network Time Protocol (NTP) server, wherein the poisoned NTP server is configured with a false current date that precedes the expiration date, wherein the configuration information further comprises instructions to utilize a poisoned Domain Name Services (DNS) server configured to redirect a request from the network device to a poisoned management service, and wherein the poisoned management service is configured to update the firmware of the network device;

responsive to the instructions to utilize the poisoned NTP server, receive, from the poisoned NTP server, instructions to replace current time information with false current time information indicative of a false current time that occurs on the false current date; and generate valid authentication information for the network device, wherein the valid authentication information is valid for the network device on the false current date.

20. A method, comprising:

receiving, by a computing system comprising one or more processor devices, a network request from a network device, wherein the network request comprises firmware information indicative of a version of firmware currently installed on the network device;

based on the firmware information, making a determination that the version of the firmware currently installed on the network device is incapable of generating valid authentication information subsequent to an expiration date that occurred prior to a current date; and responsive to the determination, generating configuration information for the network device comprising instructions to utilize a poisoned network entity, wherein the poisoned network entity comprises a poisoned Network Time Protocol (NTP) server, and wherein the poisoned NTP server is configured to report a false current time that occurs on a false current date that precedes the expiration date.

21. A computing system, comprising:

a memory; and one or more processor devices coupled to the memory to:

receive a network request from a network device, wherein the network request comprises firmware information indicative of a version of firmware currently installed on the network device;

based on the firmware information, make a determination that the version of the firmware currently installed on the network device is incapable of generating valid authentication information subsequent to an expiration date that occurred prior to a current date; and responsive to the determination, generate configuration information for the network device comprising instructions to utilize a poisoned network entity, wherein the poisoned network entity comprises a poisoned Network Time Protocol (NTP) server, and wherein the poisoned NTP server is configured to report a false current time that occurs on a false current date that precedes the expiration date.

* * * * *